Nov. 30, 1943. H. G. BLEISTEIN Re. 22,395

SHEET STACKING MACHINE

Original Filed May 28, 1940 8 Sheets-Sheet 1

Inventor

HENRY G. BLEISTEIN,

By Lockwood, Goldsmith & Galt

Attorneys

Nov. 30, 1943. H. G. BLEISTEIN Re. 22,395

SHEET STACKING MACHINE

Original Filed May 28, 1940 8 Sheets-Sheet 2

Inventor

HENRY G. BLEISTEIN,

By Lockwood, Goldsmith & Galt,

Attorneys.

Nov. 30, 1943. H. G. BLEISTEIN Re. 22,395
SHEET STACKING MACHINE
Original Filed May 28, 1940 8 Sheets-Sheet 3
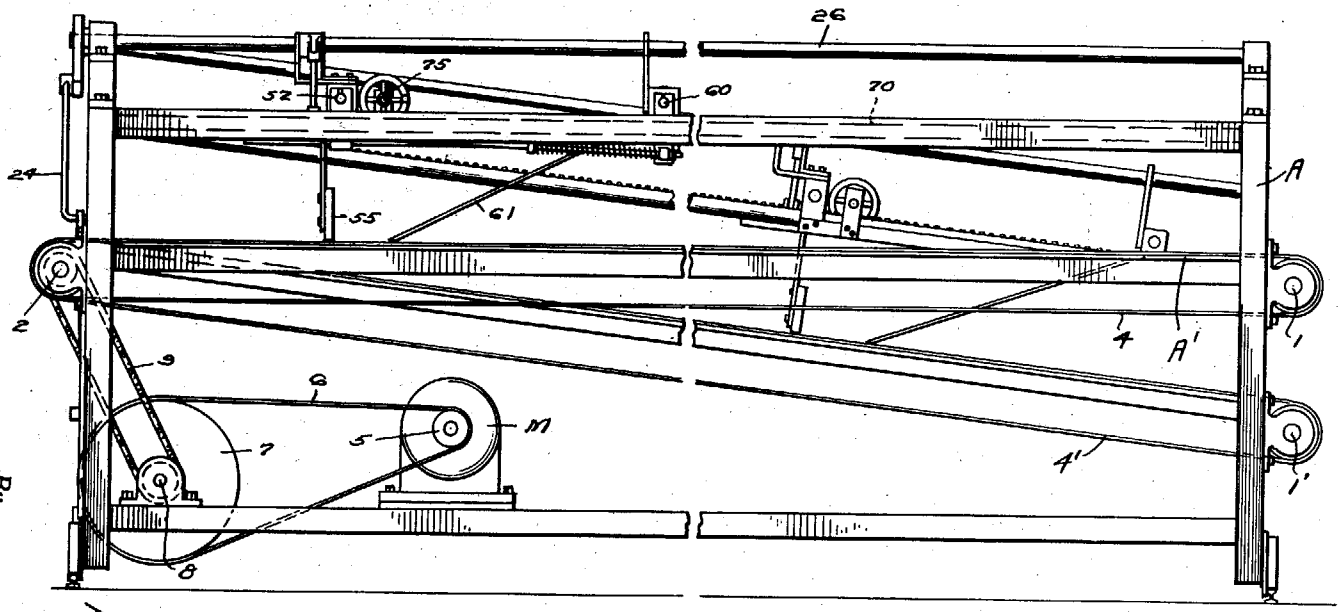
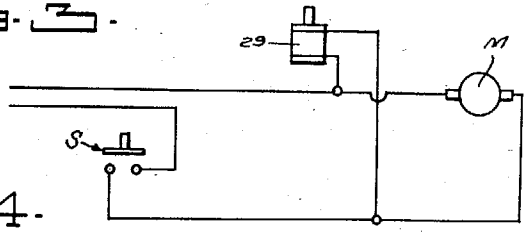
FIG. 7.
FIG. 14.
Inventor
HENRY G. BLEISTEIN,
By
Lockwood, Oldsmith & Galt.
Attorneys.

Nov. 30, 1943. H. G. BLEISTEIN Re. 22,395

SHEET STACKING MACHINE

Original Filed May 28, 1940 8 Sheets-Sheet 4

Inventor

HENRY G. BLEISTEIN,

By Lockwood, Goldsmith & Galt.

Attorneys.

Nov. 30, 1943. H. G. BLEISTEIN Re. 22,395

SHEET STACKING MACHINE

Original Filed May 28, 1940 8 Sheets-Sheet 5

Inventor

HENRY G. BLEISTEIN

By Lockwood, Goldsmith & Galt.

Attorneys.

Nov. 30, 1943. H. G. BLEISTEIN Re. 22,395

SHEET STACKING MACHINE

Original Filed May 28, 1940 8 Sheets-Sheet 6

Inventor

HENRY G. BLEISTEIN,

By Lockwood, Goldsmith & Galt.

Attorneys.

Nov. 30, 1943. H. G. BLEISTEIN Re. 22,395

SHEET STACKING MACHINE

Original Filed May 28, 1940 8 Sheets-Sheet 7

Inventor

HENRY G. BLEISTEIN,

By Lockwood, Goldsmith & Galt,

Attorneys.

Nov. 30, 1943. H. G. BLEISTEIN Re. 22,395

SHEET STACKING MACHINE

Original Filed May 28, 1940 8 Sheets-Sheet 8

Inventor

HENRY G. BLEISTEIN,

By

Lockwood, Goldsmith & Galt,

Attorneys.

Reissued Nov. 30, 1943

Re. 22,395

UNITED STATES PATENT OFFICE 22,395

SHEET STACKING MACHINE

Henry G. Bleistein, Marion County, Ind.

Original No. 2,231,179, dated February 11, 1941, Serial No. 337,709, May 28, 1940. Application for reissue May 15, 1942, Serial No. 443,123

18 Claims. (Cl. 271—75)

This invention relates to a sheet stacking machine for handling sheets as they come from corrugating and cutting machines.

The general object of this invention is to provide means for receiving the sheets as they come from the machine and stacking the sheets, and manually controlled motor driven means for freeing the stacked sheets from the stacking machine when the stack reaches the desired height, after which the conveying means convey the stacked sheets to a delivery point. The machine can also be used for handling so-called solid fiber sheets.

A further object of the invention is to provide means for holding the sheets under pressure by adjustable spring arms, and means for automatically raising the arms at the same time the gate means are raised to permit the stacked sheets to pass from the machine.

A still further object of the invention is to provide means whereby the gate means and the pressure applying means can be adjusted for different length sheets.

A still further object of the invention is to provide a second machine, made exactly the same as the first machine and placed alongside the same to receive sheets from a lower cutting or corrugating machine, the combination machine being so constructed and arranged that the operator can watch the sheets and sort the bad ones out so they will not go to other machines in the plant.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 3 is an elevational view thereof.

Figure 9 is an enlarged fragmentary top plan view.

Figure 14 is a view of the circuit.

In these views the letter A indicates an upright supporting frame or table which has the wheels *a* at its lower end for running on the tracks T so that the table or frame can be readily moved from one place to another. This table is adapted to be placed adjacent the delivery end of a corrugating or cutting machine so that it will receive the sheets coming from such machines. Front and rear transversely arranged shafts 1 and 2 are supported at the ends of the table and these shafts carry the rolls 3 for the belts 4, these belts forming conveying means for the sheets for conveying the sheets from one end of the table to the opposite end thereof.

Figure 4:
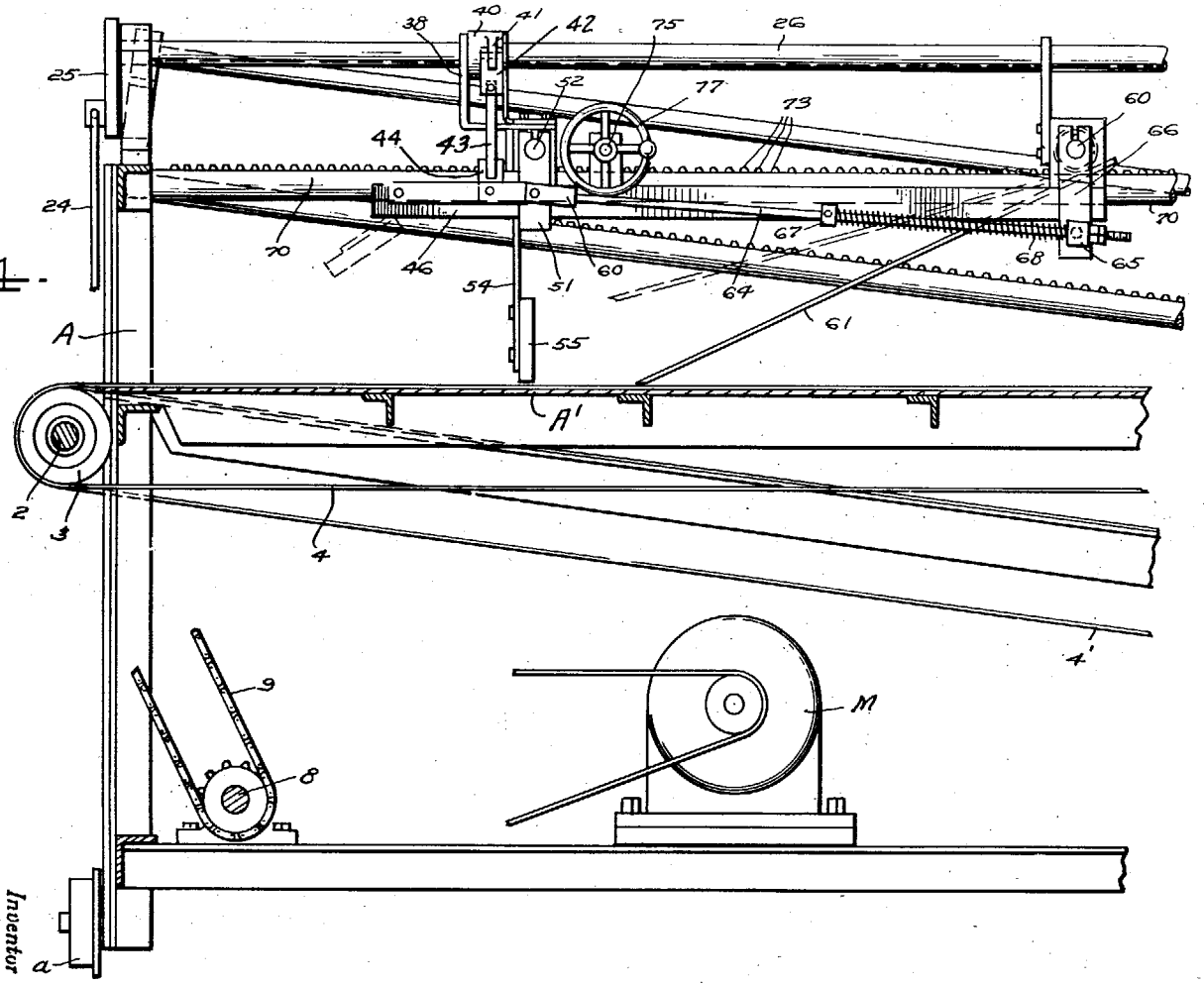
Figure 4 is a section on the line 4—4 of Figure 1.

Rigid with table A (frame) and positioned immediately beneath the upper run of belts 4 is an angle braced support plate, see Fig. 4, which is of board weight supporting character. A motor M is supported on the lower part of the table and has a pulley 5 thereon over which a belt 6 passes, see Fig. 3, the belt also passing over a pulley 7 on a shaft 8 journaled in the lower part of the table so that this shaft 8 is driven from the motor. Chain and sprocket means shown generally at 9 connect the shaft 8 with the rear shaft 2 so that this rear shaft is driven from the motor and, of course, this shaft imparts movement to the belts 4.

Figure 7:
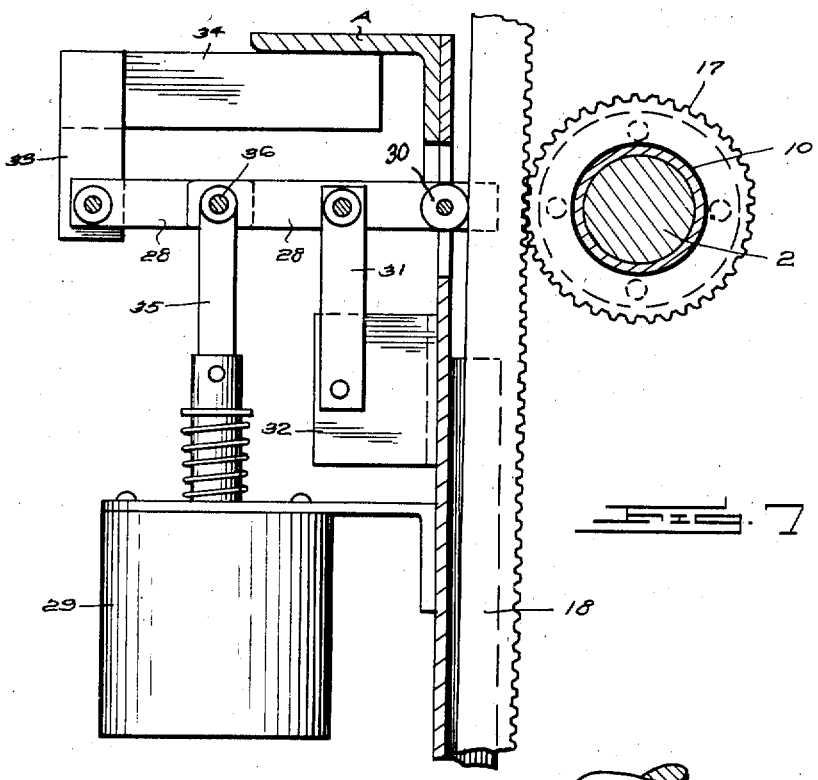
Figure 7 is a section on the line 7—7 of Figure 5.
Figure 8:
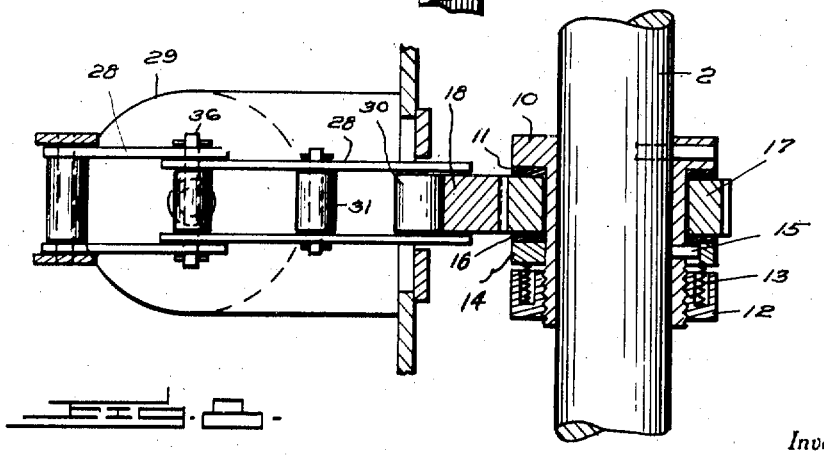
Figure 8 is a section on the line 8—8 of Figure 6.

A friction clutch sleeve 10, see Figures 7 and 8, is pinned to the shaft 2 and has an enlarged end, the inner portion of which forms a shoulder for forming a seat for a friction ring 11 and the other end of the sleeve is threaded to receive a nut 12. The inner side of this nut is formed with sockets for receiving springs 13 which bear against a ring 14 slidably arranged on a plain part of the sleeve and pinned thereto as shown at 15 so that the ring has sliding movement on the sleeve but must rotate therewith. A second friction ring 16 bears against this ring 14 and a gear 17 is rotatably arranged on the sleeve and is located between the friction rings 11 and 16 as shown in Figure 8. Of course, the springs 13 press the ring 14 and the friction ring 16 against the gear so that the rings 11 and 16 act to frictionally connect the gear 17 with the shaft 2 to cause the gear to rotate with the shaft until resistance to the rotary movement of the gear is such as to overcome the friction and then the gear will remain idle while the shaft rotates. The tension of the springs can be adjusted by moving the nut 12 on the threaded part of the sleeve.

Figure 5:
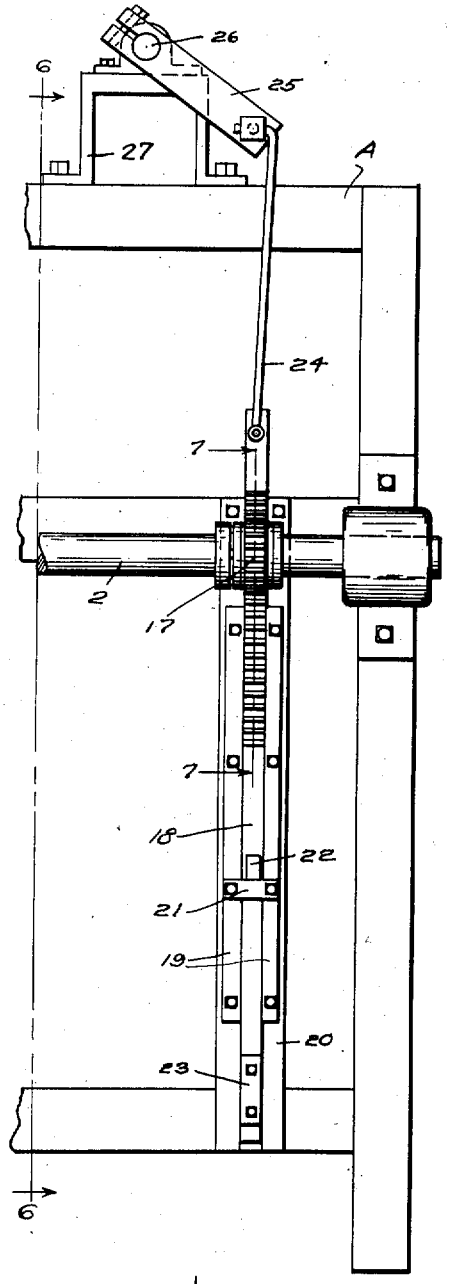
Figure 5 is an enlarged view of the right hand end of Figure 2.
Figure 6:
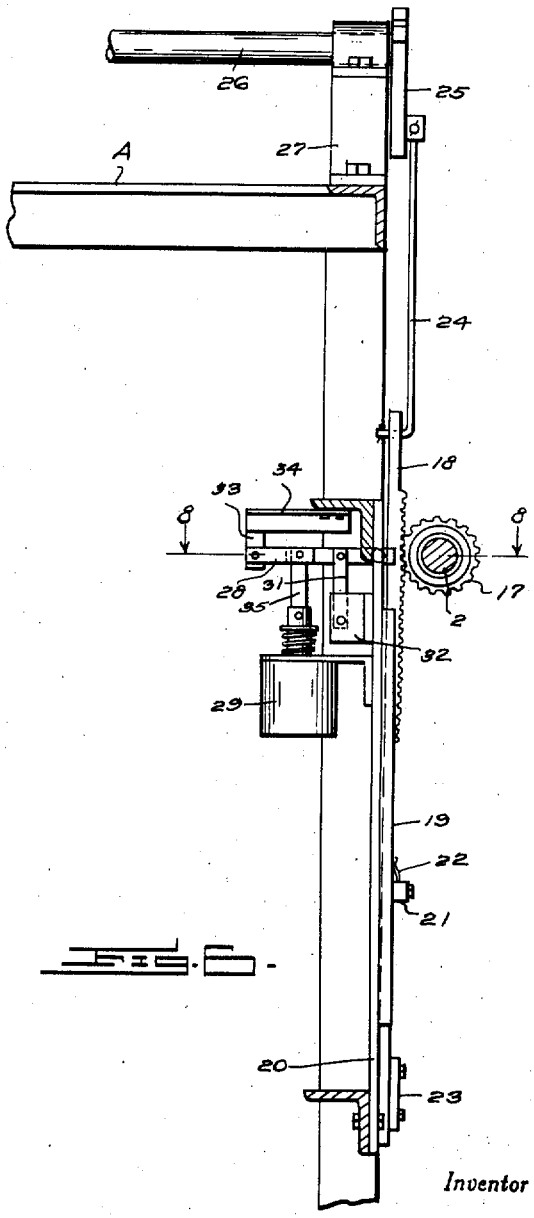
Figure 6 is a section on the line 6—6 of Figure 5.

As shown more particularly in Figures 5 and 6, a rack bar 18 is adapted to be vertically moved by the gear 17 and said rack bar is slidably supported by the guides 19 on a vertically arranged supporting member 20 at the rear end of the table and a cross piece 21 bridges the two guiding means and carries the spring 22 which acts to press the rack bar out of engagement with the gear 17. A stop block 23 is fastened to the lower end of the rack bar 18 and when in engagement with the cross piece 21 will limit upward movement of the rack bar and when the block 23 is in engagement with the cross piece further upward movement of the rack bar is prevented and then the gear will simply slip on the sleeve 10 and will not be rotated by the shaft 2. The upper end of the rack bar is connected by a link 24 to an arm 25 connected to a shaft 26 supported by the uprights 27 at the top of the front and rear ends of the table so that the shaft 26 is rocked by vertical movement of the rack bar.

A pair of double toggle links 28, see Figs. 7 and 8, is actuated by a solenoid 29, the outer link carrying a roller 30 for engaging the back of the rack bar 18 to press the same against the gear 17 when the toggle links are in straight position. The roller carrying part is pivoted to a bracket 31 carried by a support 32 attached to a part of the frame and the other pair is pivoted to a bracket 33 depending from a bracket 34 attached to a side member of the table as shown in Figures 6 and 7. The core 35 of the solenoid is connected to the pivot pin 36 which pivots the toggle links together at their adjacent ends. Thus it will be seen that when the solenoid is energized the toggle links will be moved to the position shown in Figure 7 so that the roller 30 will be pressing against the rack bar 18 to move the same into engagement with the gear 17. Thus when the shaft 2 starts to rotate it will raise the rack bar and move the shaft 26 through means of the link 24 and the arm 25. When the solenoid is deenergized the toggle links will be broken so that the roller 30 moves out of engagement with the rack and the rack can descend to its starting point under the weight of the parts.

The motor M, see Fig. 3, has a magnetic switch S which is preferably operated by a foot button which is adapted to be stepped on by the operator. The solenoid is connected to the circuit on the motor side of magnetic switch so that when the foot button is pressed the solenoid is energized to cause the toggle links to move the roller 30 against the rack bar 18.

Figure 1:
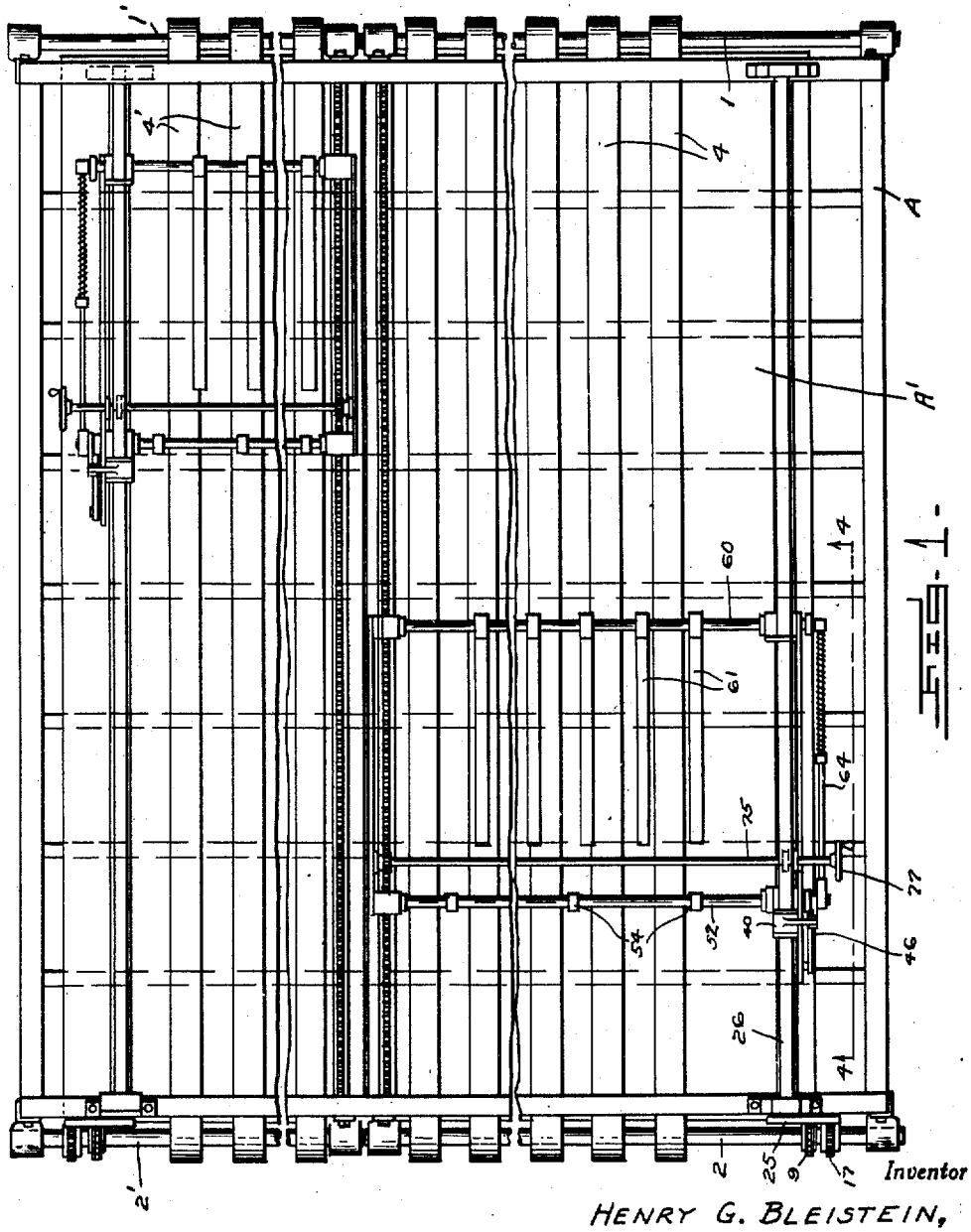
Figure 1 is a top plan view of the apparatus.
Figures 5, 10:
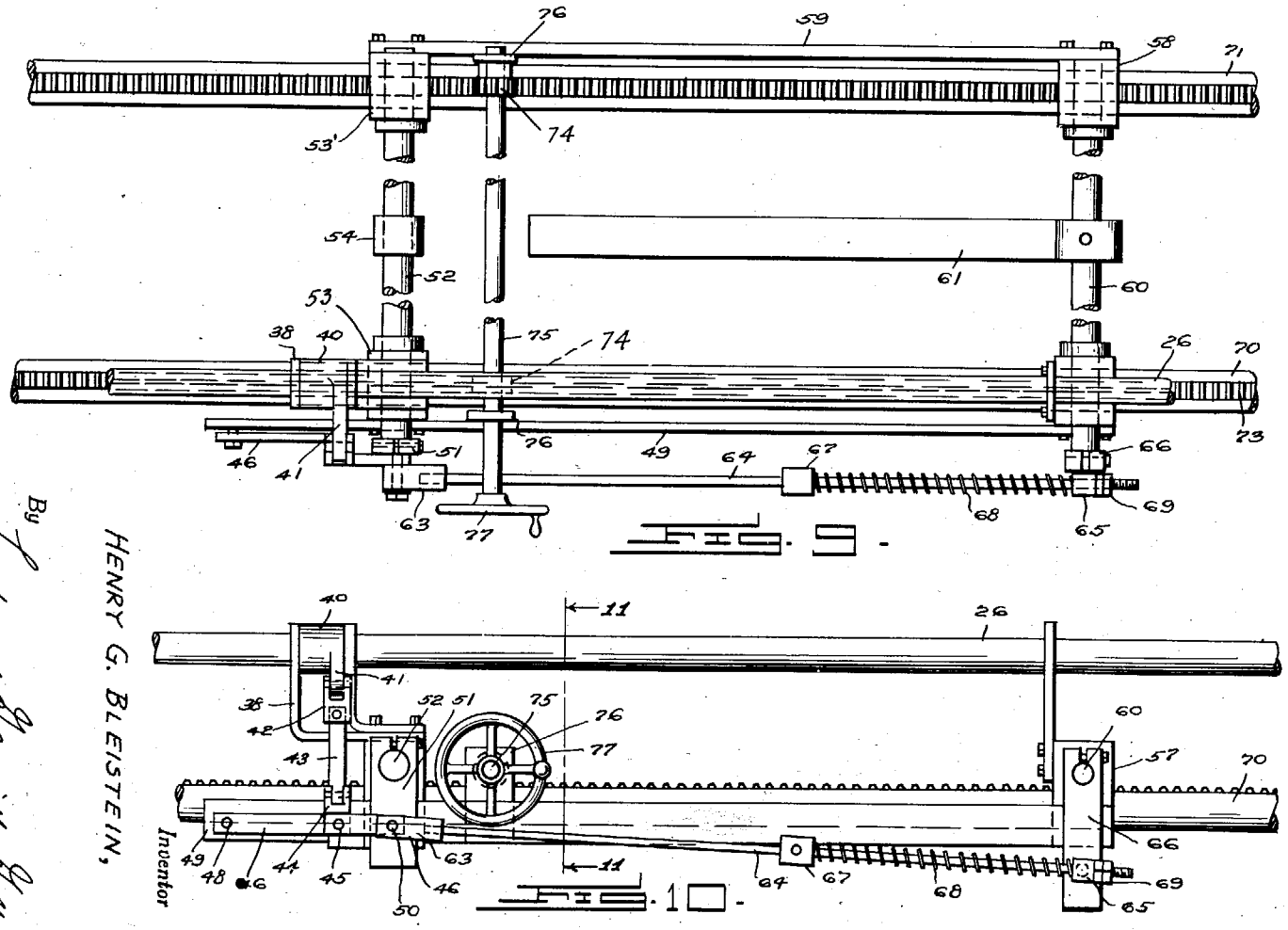
Figure 10 is an elevational view of Figure 9 looking toward the right hand end thereof.
Figure 11:
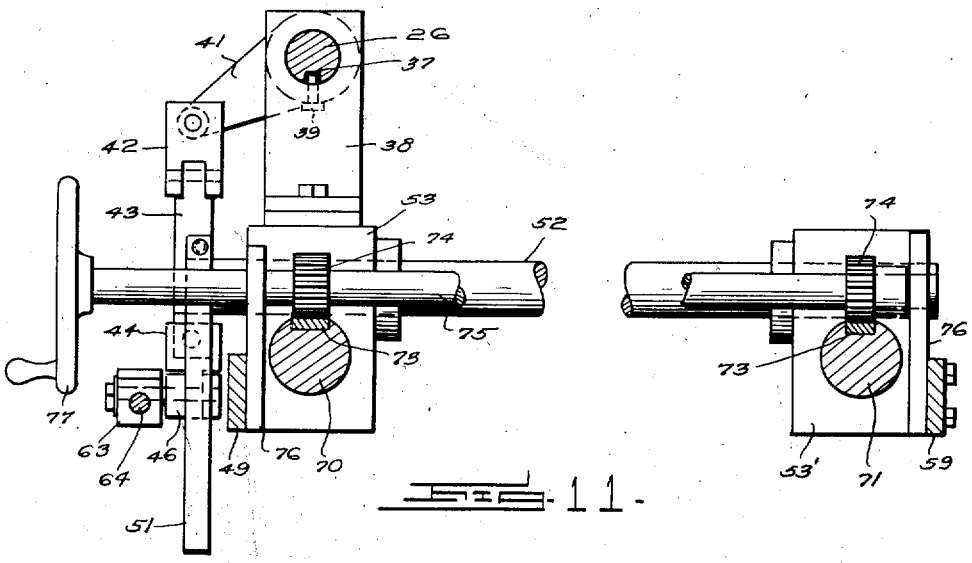
Figure 11 is a section on the line 11—11 of Figure 10.
Figure 12:
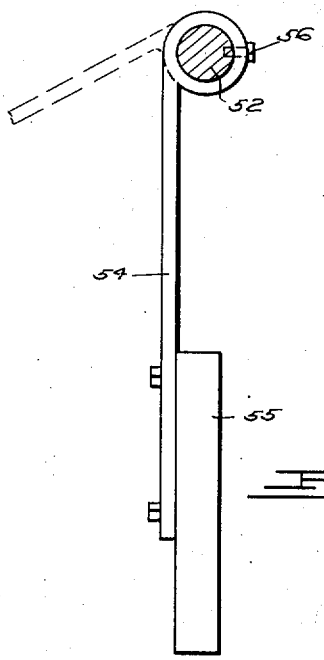
Figure 12 is an end view of the gate means with the supporting shaft in section.
Figure 13:
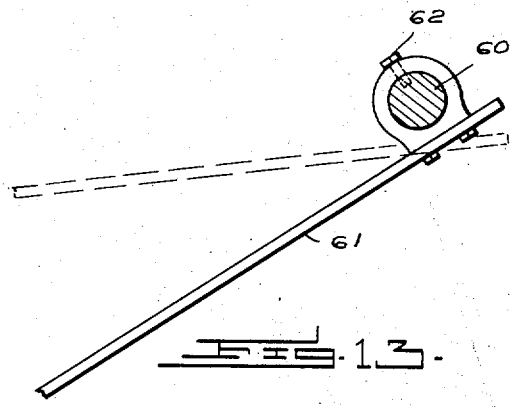
Figure 13 is a similar view of the pressure means, these two views showing the parts in one position in full lines and in another position in dotted lines.

The shaft 26 runs the full length of the machine, see Fig. 1, and it has a longitudinally extending keyway 37 therein, see Figure 11. A double arm bracket 38, see Figs. 9 to 11, is slidably supported on shaft 26 and a collar 40 is located between the arms of the bracket and is keyed to shaft 26 by a key 39 engaging the keyway 37. Said collar or sleeve has an arm 41 thereon which is connected to a coupling 42 which is pivoted to the upper end of a link 43 which, in turn, is pivoted to a coupling 44 at its lower end and this coupling is connected to the pivotal points 45 of a pair of toggle links 46. One of these links is pivoted at its outer end as shown at 48 to a bar 49 and the other link is pivoted at 50 to an arm 51 fastened to a gate shaft 52, an end of which is journaled in the supporting block 53 to which the bracket 38 is connected and which is connected to the bar 49. This shaft 52 has the upper ends of arms 54 attached thereto, see Figure 12, and a gate forming strip 55 is carried by these arms 54, the gate extending close to the upper portions of the belts to prevent the boards or sheets from passing when the gate is in lowered position, see Figs 2 and 3. The arms 54 are adjustably connected with the shaft 52 as shown at 56. A second supporting block 53′, see Figures 9 and 11, is arranged at the other side of the machine and rotatably supports the other end of the shaft 52. A supporting block 57, see Figures 9 and 10, is connected to the front end of the member 49 and a block 58, see Figure 9, at the opposite side of the machine is connected by an elongated member 59 with the block 53′. These blocks 57 and 58 rotatably support a cross shaft 60 which has the spring arms 61 adjustably connected thereto as shown at 62 in Figure 13. A coupling member 63—see Figure 10—connects the pivotal point 50 of the front toggle lever to a rod 64 which is adjustably connected as shown at 65 with an arm 66 attached to the shaft 60. A collar 67 is adjustably connected with the rod 64 and a spring 68 encircles the rod between the collar 67 and the connection 65 so that the tension of the spring can be controlled and the rod slides through the connection 65 and has nuts 69 attached thereto. The spring 68 tends to move the arm 66 to rotate the shaft 60 to cause the spring arms 61 to engage the sheets on the belts with friction pressure, and this pressure can be adjusted by adjusting the collar 67 on the rod 64. The blocks 53 and 57 are slidably arranged on a longitudinally extending shaft 70, see Figures 9 and 10, supported at the top of the table, while the blocks 53′ and 58 are slidably arranged on a shaft 71 at the opposite side of the table. The upper portions of these shafts 70 and 71 are formed with grooves for receiving the racks 73 which are engaged by the pinions 74 on a shaft 75 rotatably supported by brackets 76 connected with the members 49 and 59 and one end of the shaft 75 has a hand wheel 77 attached thereto so that the shaft can be turned and when this is done the pinions 74 engaging the racks of the shafts 70 and 71 will move the members 49 and 59 longitudinally so that the parts which carry the gate shaft and the spring arm carrying shaft will be moved either toward the front of the table or to the rear thereof according to the direction of movement of the shaft 75. Thus the gate means and the means for applying pressure to the sheets can be adjusted longitudinally of the table to make the machine handle sheets of different sizes.

It will be seen that when the shaft 26 is rocked by the rack bar 18 the sleeve 40 will also be rocked so that its arm 41 will pull upwardly the link 43 to break the toggle link arrangement 46 at 45 and this will swing the arm 51 to rock the shaft 52 so that the gate 55 carried thereby will be raised. At the same time a pull will occur upon the rod 64 to swing the arm 66 to rock the shaft 60 and this will raise the spring arms 61 to release the sheet stack of pressure. Thus the gate and the pressure arms are raised so that the sheets on the conveying belts can pass to the rear or discharge end of the machine.

The top of the table A' is located in a plane below the top of the sheet forming machine and the feeding means of the forming machine will deposit a sheet upon the belts 4, it being understood that the gate means are adjusted so that the rear or oncoming or advancing end of the sheet will engage the gate just as the front or trailing edge of the sheet is dropping from the forming machine. Then the next sheet from the forming machine will be deposited upon the first sheet and so on until a number of sheets are stacked upon the belts 4 and the rear ends of these stacked sheets will engage the gate 55 so that the sheets are stacked upon the belts and the pressure arm 61 will prevent too free movement of the sheets. After the stack has reached the desired height the operator presses upon the switch S which energizes the solenoid 29 so the toggle links 28 are caused to move the roller 30 against the rack 18 to push the rack against the gear 17 and the motor starts up which moves the rack 18 upwardly and imparts movement to the belts 4. The movement of the rack 18 will rock the shaft 26 and this rocking movement will break the toggle linkage 46 which causes the arm 51 to rock the shaft 52 to raise the gate and the rod 64 will move the arm 66 to rock the shaft 60 to raise the spring arms and this will permit the stack of sheets on the belt 4 to move freely to the rear end of the machine. Then by releasing the switch S the parts will return to normal position so that the gate will stop movement of the other sheets delivered to the machine so that these sheets will be stacked and, of course, the spring arms will return to operative position.

As before stated when different length sheets are to be handled the shaft 75 is turned by its hand wheel 77 to adjust the gate and spring arm carrying parts to the desired position on the machine to accommodate the sheets of different lengths from those of the sheets handled by the machine previously.

Figure 2:
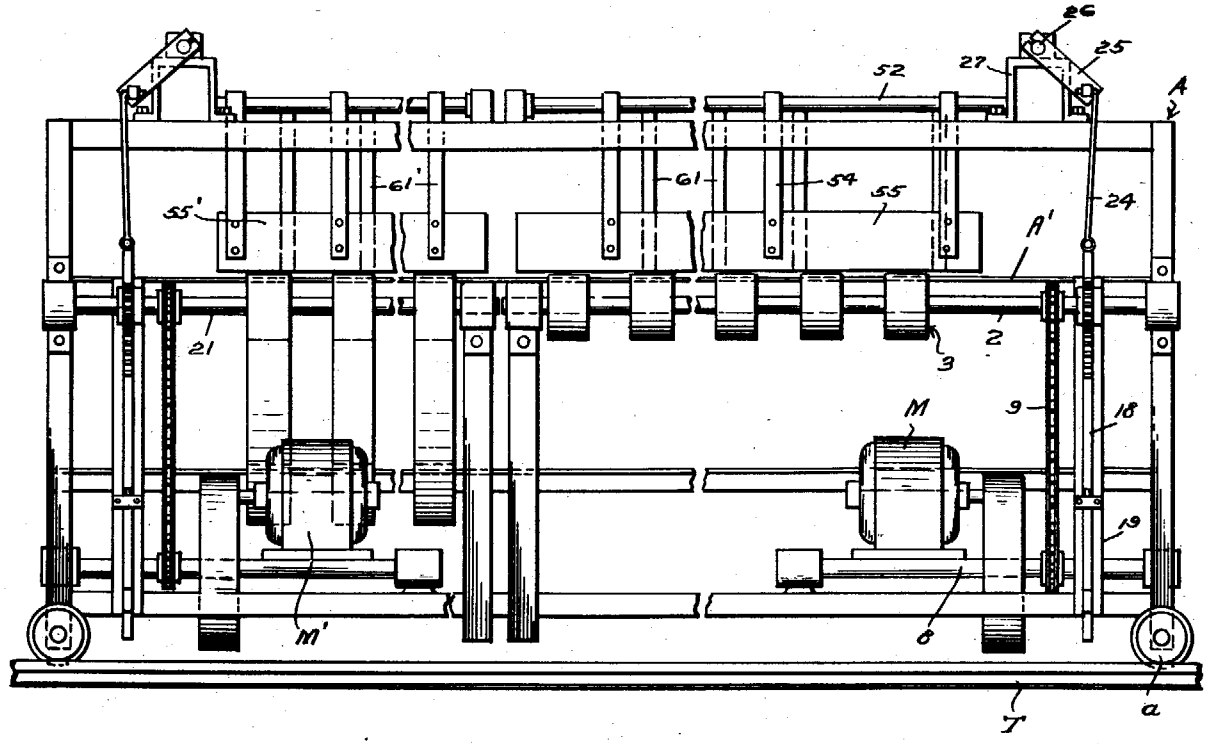
Figure 2 is a view looking toward the rear end thereof.

At one side of the table A' a second mechanism, see Figures 1, 2 and 3, including gate means 55' and spring arms 61' with means similar to those before described for actuating said means, is arranged, said means being driven by the motor M' and this motor drives the means in the same manner as those before described. The only difference in this second arrangement of parts is that the belts 4' slope upwardly and rearwardly due to the fact that the front roller carrying shaft 1' is located in a lower plane than that of the front shaft 1 and the rear shaft 2' is substantially in alignment with the rear shaft 2. Thus these belts 4' will receive sheets from a lower forming device and move them upwardly and rearwardly and these sheets will be stacked by the stacking means associated therewith in the same manner as in the first and companion machine.

It will be seen that this second companion machine is entirely independent of the first machine excepting that it is carried by the same frame. This arrangement is designed to take sheets from duplex knife machines so that combination sheets can be run at high speed and without damage to the sheets and with as little confusion as when the sheets are handled from a single machine. The second machine can be adjusted to handle sheets of different lengths from those handled by the first machine, as shown in Fig. 1.

It is thought from the foregoing description that the advantages and novel features of the invention will be quickly apparent.

It is to be understood that changes may be made in the construction and in the combination and arrangement of the several parts provided that such changes fall within the scope of the appended claims.

Having described the invention, what is claimed as new is:

1. A machine for handling sheets from a forming machine comprising a frame, front and rear shafts carried by the frame, rolls carried by the shafts, belts passing over the rolls and receiving sheets from the forming machine, a motor for rotating one of the shafts a gate for holding the sheets against movement on the belts and for causing the sheets to stack upon the belts, magnetic means for raising the gate, and means for simultaneously closing the circuit to the motor and to the magnetic means.

2. A machine for handling sheets from a forming machine comprising a frame, front and rear shafts carried by the frame, rolls carried by the shafts, belts passing over the rolls, a motor for driving one of the shafts, a gate extending across the top portions of the belts for causing sheets to stack up on said belts, tension arms for applying pressure on the sheets, magnetic means for simultaneously raising the gate and the arms, and means for simultaneously closing a circuit to the motor and the magnetic means.

3. A machine for handling sheets from a forming machine comprising a frame, front and rear shafts carried by the frame, rolls carried by the shafts, belts passing over the rolls, a motor for driving one of the shafts, a gate extending across the top portions of the belts for causing sheets to stack up on said belts, tension arms for applying pressure on the sheets, magnetic means for simultaneously raising the gate and the arms, means for simultaneously closing a circuit to the motor and the magnetic means, and means for adjusting the gate, tension arms and the operating means therefor longitudinally of the machine to adjust the machine for different lengths of sheets.

4. A sheet handling machine of the class described comprising a frame, front and rear shafts journaled in the frame, endless belts carried by the shafts for receiving sheets from another machine, a cross shaft, arms depending therefrom, a gate carried by the arms, a rock shaft, means actuated by rocking movement of the shaft last-mentioned for raising the gate, an arm on the shaft, a rack bar connected with the arm for rocking the shaft, a friction gear on the motor driven shaft, magnetic means for moving the rack bar into engagement with the friction gear, said magnetic means being energized when the circuit of the motor is closed, and means for adjusting the gate means longitudinally of the machine to adjust the machine for different lengths of sheets.

5. A sheet handling machine of the class described comprising a frame, front and rear shafts journaled in the frame, endless belts carried by the shafts for receiving sheets from another machine, a cross shaft, arms depending therefrom, a gate carried by the arms, a rock shaft, means actuated by rocking movement of the shaft last-mentioned for raising the gate, an arm on the shaft, a rack bar connected with the arm for rocking the shaft, a friction gear on the motor driven shaft, magnetic means for moving the rack bar into engagement with the friction gear, said magnetic means being energized when the circuit of the motor is closed, and means for adjusting the gate means longitudinally of the machine to adjust the machine for different lengths of sheets, a second pair of front and rear shafts carried by another part of the frame, the front shaft of the second pair being arranged at a lower level than the front shaft of the first pair, belts passing over the shafts of the second pair, a motor for rotating one of the shafts of the second pair, a gate for the belts of the second pair, a shaft carrying the gate, a second cross shaft, means operated thereby for raising the second gate, a second rack bar for operating the second rock shaft, a friction gear on the second motor driven shaft, magnetic means for moving the second rack bar into engagement with the second friction gear, and said second magnetic means being actuated when the second motor has its circuit closed.

6. In a machine for handling sheets, a portable frame, front and rear shafts rotatably arranged therein, a motor for driving the rear shaft, belts carried by the shafts and receiving sheets from another machine, a longitudinally extending shaft supported for rocking movement in the top of the frame, a rack bar for rocking the shaft, a friction gear on the rear motor driven shaft, magnetic means for moving the rack bar against the friction gear, stop means for limiting upward movement of the rack bar, said magnetic means being operated when the circuit of the motor is closed, supporting means carried by the frame, a pair of shafts extending longitudinally of the frame and provided with rack teeth upon which the supporting means are slidably arranged, manually operated means connected with the supporting means and engaging the teeth of said longitudinally extending shafts for moving the supporting means longitudinally, front and rear shafts supported for rocking movement in the supporting means and extending transversely of the frame, arms depending from the rear cross shaft, gates carried by the arms, spring arms depending from the second cross shaft for frictionally engaging sheets on the belts, means actuated by rocking movement of the rock shaft for raising the gate, and means associated with the last-mentioned means for raising the spring arms.

7. In a machine for handling sheets, a portable frame, front and rear shafts rotatably arranged therein, a motor for driving the rear shaft, belts carried by the shafts and receiving sheets from another machine, a longitudinally extending shaft supported for rocking movement in the top of the frame, a rack bar for rocking the shaft, a friction gear on the rear motor driven shaft, magnetic means for moving the rack bar against the friction gear, stop means for limiting upward movement of the rack bar, said magnetic means being operated when the circuit of the motor is closed, supporting means carried by the frame, a pair of shafts extending longitudinally of the frame and provided with rack teeth upon which the supporting means are slidably arranged, manually operated means connected with the supporting means and engaging the teeth of said longitudinally extending shafts for moving the supporting means longitudinally, front and rear shafts supported for rocking movement in the supporting means and extending transversely of the frame, arms depending from the rear cross shaft, gates carried by the arms, spring arms depending from the second cross shaft for frictionally engaging sheets on the belts, means actuated by rocking movement of the rock shaft for raising the gate, means associated with the last-mentioned means for raising the spring arms, and means associated with the means which connect the second cross shaft with the first cross shaft for applying tension to the spring arms.

8. An intermittently operable machine for handling sheets from a forming machine comprising weight supporting means, means thereabove and supported thereby for sheet reception, support and movement, barrier means normally constrained to sheet arresting position immediately above the second mentioned means and movable to non-arresting position, the sheets being accumulated in stacked relation, each successively presented sheet being uppermost in the stack, means for moving the barrier means to non-arresting position and actuating the second mentioned means for stack discharge, and pressure applying means above the second mentioned means and normally constrained to engage the stack uppermost sheet regardless of the number of sheets in the stack and movable to non-pressing position with barrier and second mentioned means movement to facilitate stack movement to discharge.

9. A machine for handling sheets from a forming machine comprising a frame, front and rear shafts carried by the frame, rolls carried by the shafts, belts passing over the rolls and receiving sheets from the forming machine, means for rotating one of the shafts, a gate for holding the sheets against movement on the belts and for sheet stack accumulation therein, means for moving the gate to permit stack movement to discharge, means for applying pressure to the stack in the accumulation thereof, and means for simultaneously effecting operation of the gate moving means, shaft rotating means and pressure applying means for stack release and stack discharge.

10. A machine for handling sheets from a forming machine comprising a frame, front and rear shafts carried by the frame, rolls carried by shafts, belts passing over the rolls and receiving sheets from the forming machine, means for rotating one of the shafts, a gate for holding the sheets against movement on the belts and for sheet stack accumulation therein, means for raising the gate, means for simultaneously effecting operation of the gate raising means and shaft rotating means, weight supporting means in juxtaposition to the belts, for stack weight support, and means adjustably mounting the gate upon the frame for sheet size accommodation.

11. A machine for handling sheets from a forming machine comprising a frame, front and rear shafts carried by the frame, rolls carried by the shafts, belts passing over the rolls and receiving sheets from the forming machine, means for rotating one of the shafts, a gate for holding the sheets against movement on the belts and for sheet stack accumulation therein, means for moving the gate to permit stack movement to discharge, means for applying pressure to the stack in the accumulation thereof, means for simultaneously effecting operation of the gate moving means, shaft rotating means and pressure applying means for stack release and stack discharge, and means adjustably mounting the gate and pressure applying means upon the frame for sheet size accommodation.

12. A machine for handling sheets from a forming machine comprising a frame, front and rear shafts carried by the frame, rolls carried by the shafts, belts passing over the rolls and receiving sheets from the forming machine, means for rotating one of the shafts, a gate for holding the sheets against movement on the belts and for sheet stack accumulation therein, means for moving the gate to permit stack movement to discharge, means for applying pressure to the stack in the accumulation thereof, means for simultaneously effecting operation of the gate moving means, shaft rotating means and pressure applying means for stack release and stack discharge, means adjustably mounting the gate and pressure applying means upon the frame for sheet size accommodation, and a single means operatively associated with said last mentioned adjustable means for simultaneously shifting the gate and pressure applying means relative to the frame.

13. A machine as defined by claim 9, characterized by the addition of a table immediately beneath the upper run of all belts for belt, sheet and stack support purposes, and normally opposing the pressure of the pressure applying means.

14. A machine for handling sheets from a forming machine, comprising a frame, front and rear shafts carried by the frame, rolls carried by the shafts, belts passing over the rolls, a motor for driving one of the shafts, a table beneath the upper run of said belts and supporting same between rolls, a gate normally positioned above the belt upper runs and extending across same for causing stack accumulation of sheets upon the belts, overhead arms for applying pressure to the uppermost sheet of the stack, means for simultaneously elevating the arms and moving the gate to non-barring position to facilitate stack movement and discharge respectively, and a single means for simultaneously actuating the last mentioned means and energizing the motor for belt movement.

15. A machine for handling sheets from a forming machine, comprising a frame, front and rear shafts carried by the frame, rolls carried by the shafts, belts passing over the rolls, a motor for driving one of the shafts, a table beneath the upper run of said belts and supporting same between rolls, a gate normally positioned above the belt upper runs and extending across same for causing stack accumulation of sheets upon the belts, overhead arms for applying pressure to the uppermost sheet of the stack, means for simultaneously elevating the arms and moving the gate to non-barring position to facilitate stack movement and discharge respectively, a single means for simultaneously actuating the last mentioned means and energizing the motor for belt movement, and means for adjusting longitudinally of the machine for different lengths of sheets, said gate, arms and first mentioned simultaneously elevating means.

16. A machine for handling sheets from a duplex knife, combination sheet forming machine including a frame, front and rear shafts carried thereby, rolls carried by said shafts, belts passing over the rolls and receiving sheets from the forming machine, means for rotating one of the shafts for belt movement, a gate for holding the sheets against movement on the belts for sheet stack accumulation therein, means for moving the gate to non-holding position, and means for simultaneously effecting operation of the gate moving means and the shaft rotating means, a second pair of front and rear shafts carried by said frame, the front shafts having different elevations, other rolls carried by said second pair of shafts, other belts passing over said other rolls and also receiving sheets from the forming machine, other means for rotating one of the second pair of shafts for belt movement, a second gate for holding the sheets on said other belts against movement for second sheet stack accumulation, still other means for moving the second gate to non-holding position, and still further means for simultaneously effecting operation of said second gate moving means and said second shaft rotating means.

17. A machine for stacking sheets from a duplex machine including a frame, shaft means supported thereby and at the discharge end of the machine, a pair of parallel shafts parallel to the shaft means and at the intake end and supported at different horizontal levels, endless conveyor means for each shaft and associated with the shaft means, power means for rotating the shaft means, the conveyor means receiving sheets at different levels from the duplex machine, gate means operatively associated with each conveyor means for arresting sheet travel and sheet stacking, and release means for each gate means for stack release and discharged upon gate means release.

18. A machine as defined by claim 17 wherein the shaft means includes a pair of aligned shafts and the power means includes a motor for each aligned shaft.

HENRY G. BLEISTEIN.